(12) United States Patent
Okubo

(10) Patent No.: US 8,891,119 B2
(45) Date of Patent: Nov. 18, 2014

(54) MULTIFUNCTION PERIPHERAL AND PROGRAM USED THEREIN

(75) Inventor: Tomoaki Okubo, Tokyo (JP)

(73) Assignee: Oki Data Corporation, Tokyo (JP)

(*) Notice: Subject to any disclaimer, the term of this patent is extended or adjusted under 35 U.S.C. 154(b) by 232 days.

(21) Appl. No.: 13/449,443

(22) Filed: Apr. 18, 2012

(65) Prior Publication Data

US 2012/0268766 A1 Oct. 25, 2012

(30) Foreign Application Priority Data

Apr. 20, 2011 (JP) ................................. 2011-094112

(51) Int. Cl.
*G06F 3/12* (2006.01)
*H04N 1/00* (2006.01)
*H04N 1/32* (2006.01)
*H04N 1/333* (2006.01)
*H04N 1/327* (2006.01)
*G06K 15/00* (2006.01)

(52) U.S. Cl.
CPC ....... *H04N 1/00217* (2013.01); *H04N 1/00954* (2013.01); *H04N 2201/0065* (2013.01); *H04N 1/32058* (2013.01); *H04N 1/0022* (2013.01); *H04N 2201/002* (2013.01); *H04N 1/33369* (2013.01); *H04N 2201/0093* (2013.01); *H04N 1/32053* (2013.01); *H04N 1/33323* (2013.01); *H04N 2201/0094* (2013.01); *H04N 1/32765* (2013.01)

USPC ......... 358/1.15; 358/1.13; 358/420; 358/1.16

(58) Field of Classification Search
CPC ............ H04N 1/0022; H04N 1/32053; H04N 1/32058; H04N 1/32765; H04N 1/33369; H04N 2201/002; H04N 1/32048
See application file for complete search history.

(56) References Cited

U.S. PATENT DOCUMENTS

2006/0190496 A1* 8/2006 Tsunoda ........................ 707/200
2010/0011006 A1* 1/2010 Shirai ............................. 707/10

FOREIGN PATENT DOCUMENTS

JP A-10-224544 8/1998

* cited by examiner

*Primary Examiner* — Dov Popovici
(74) *Attorney, Agent, or Firm* — Muncy, Geissler, Olds & Lowe, P.C.

(57) ABSTRACT

A multifunction peripheral includes two types of communication parts that communicate based on communication destination information, a communication designation information database in which identification information are stored, and a post-process controller that determines that the communication destination information for a same destination is updated when either one of the communication destination information in the communication destination information database is updated, and determines that the communication destination information for another destination is assigned to the identification information when both of the communication destination information in the communication destination information database are updated.

11 Claims, 16 Drawing Sheets

Fig. 2A

Address Information

| | | |
|---|---|---|
| Transmission Destination Information | Speed Dial No. | 1 ~121 |
| | Fax No. | 012-333-4444 ~122 |
| | E-Mail Address | ~123 |

⋮

| Speed Dial No. | 50 |
|---|---|
| Fax No. | |
| E-Mail Address | |

Fig. 2B

Address Information

| | | |
|---|---|---|
| Transmission Destination Information | Speed Dial No. | 1 ~121 |
| | Fax No. | 012-333-4444 ~122 |
| | E-Mail Address | aaa@bbb.com ~123 |

⋮

| Speed Dial No. | 50 |
|---|---|
| Fax No. | |
| E-Mail Address | |

|  |  | E-Mail Address | | |
|---|---|---|---|---|
|  |  | No Change (Already Registered) | Add | Update/Delete |
| Fax No. | No Change |  | A/- | - |
|  | Update | B/C | C/D | C/D |
|  | Delete | A/C | C/D | C/D |

"A: Switch to e-mail transmission and transmit e-mail"
"B: Change destination to post-update fax number"
"C: Retain fax number at time of scheduling"
"D: Cancel schedule"
"-: No change"

"/" indicates selections to be displayed.

Time fax transmission with updated speed dial of "1" as destination has been scheduled. What would you like to do for the schedule of the time fax transmission.

A: Switch to e-mail transmission and transmit e-mail — 62

B: Change destination to post-update fax number — 63

C: Retain fax number at time of scheduling — 64

D: Cancel schedule — 65

-: No change — 66

Fig. 6

|  |  | Fax No. | | |
|---|---|---|---|---|
|  |  | No Change (Already Registered) | Add | Update/Delete |
| E-Mail Address | No Change |  | a/- | - |
|  | Update | b/c | c/d | c/d |
|  | Delete | a/c | c/d | c/d |

"a: Switch to fax transmission and transmit fax"
"b: Change destination to post-update e-mail address"
"c: Retain e-mail address at time of scheduling"
"d: Cancel schedule"
"-: No change"

"/" indicates selections to be displayed.

Fig. 11

Flow For Switching to Fax Transmission (Part 1)

Flow For Switching to Fax Transmission (Part 2)

MULTIFUNCTION PERIPHERAL AND PROGRAM USED THEREIN

CROSS REFERENCE TO RELATED APPLICATION

The present application is related to, claims priority from and incorporates by reference Japanese Patent Application No. 2011-094112, filed on Apr. 20, 2011.

TECHNICAL FIELD

The present application relates to a multifunction peripheral that performs communication based on communication destination information and a program used in the multifunction peripheral.

BACKGROUND

As a multifunction peripheral, there is a device, in which functions, such as a printer function, a scanner function, a facsimile (fax) function, an electronic mail (e-mail) function, an internet fax function and the like, are installed. The multifunction peripheral may be called a multifunction printer (MFP).

Conventionally, this type of multifunction peripherals includes a time designated transmission function by which read image data is transmitted at designated time, and an address book in which transmission destinations are registered, and performs a time designated transmission job using the time designated transmission function by depressing a speed dial number to designate a transmission designation registered in the address book (see JP Patent Laid-Open Patent Application No. 10-224544 (paragraphs 0002, 0006, etc.).

However, in the conventional device, when a change is made to the registered communication destination information in the conventional device, it is difficult to distinguish (determine) whether the change is made to the communication destination information, such as a fax number, an e-mail address and the like, as a result of a change to the communication destination itself that corresponds to identification information, such as a speed dial number, one-touch key or the like, or as a result of a change to a department or communication environment of the commutation destination without any change to the communication destination that corresponds to the identification information.

The present application considered the above-described problem. An object of the present application is to provide a multifunction peripheral that is capable of determining a reason for a change to communication destination information when the change is made to the communication destination information, and a program used in the multifunctional peripheral

SUMMARY

A multifunction peripheral includes at least two types of communication parts that communicate based on communication destination information configured from first communication designation information and second communication destination information, a communication designation information database in which identification information corresponding to respective destinations and the communication destination information are stored in correspondence with each other, and a post-process controller that determines that the communication destination information for a same destination that is identical to a pre-update destination is updated when either one of the first communication destination information and the second communication destination information in the communication destination information database is updated, and determines that the communication destination information for another destination that is not identical to the pre-update destination is assigned to the identification information when both of the first communication destination information and the second communication destination information in the communication destination information database are updated.

A program stored in a non-transitory computer-readable storage media and to be executed by a controller of a multifunction peripheral that includes a communication designation information database in which identification information corresponding to respective destinations and communication destination information configured from first communication designation information and second communication destination information is stored in correspondence with each other, and a communication part, the program causing the controller to perform, a post-process controller function that determines that the communication destination information for a same destination that is identical to a pre-update destination is updated when either one of the first communication destination information and the second communication destination information in the communication destination information database is updated, and determines that the communication destination information for another destination that is not identical to the pre-update destination is assigned to the identification information when both of the first communication destination information and the second communication destination information in the communication destination information database are updated, and a communication function that causes the communication part to perform communication based on the communication destination information determined by the post-process controller function.

According to the present application, the reason for the change to the communication destination information is determined when the change is made to the communication destination information.

BRIEF DESCRIPTION OF THE DRAWINGS

FIG. 2A and 2B are data configuration diagrams for an address book database (DB) included in the multifunction peripheral according to the first embodiment.

FIG. 5 is an explanatory diagram for explaining a correspondence table that summarizes options for processes for a time fax transmission job executed by the multifunction peripheral according to the first embodiment.

FIG. 6 is an explanatory diagram for explaining a process selection screen that displays the options for the processes for the time fax transmission job executed by the multifunction peripheral according to the first embodiment.

FIG. 11 is an explanatory diagram for explaining a correspondence table that summarizes options for processes for a time e-mail transmission job executed by the multifunction peripheral according to the second embodiment.

DETAILED DESCRIPTION OF EMBODIMENTS

Figure 1:
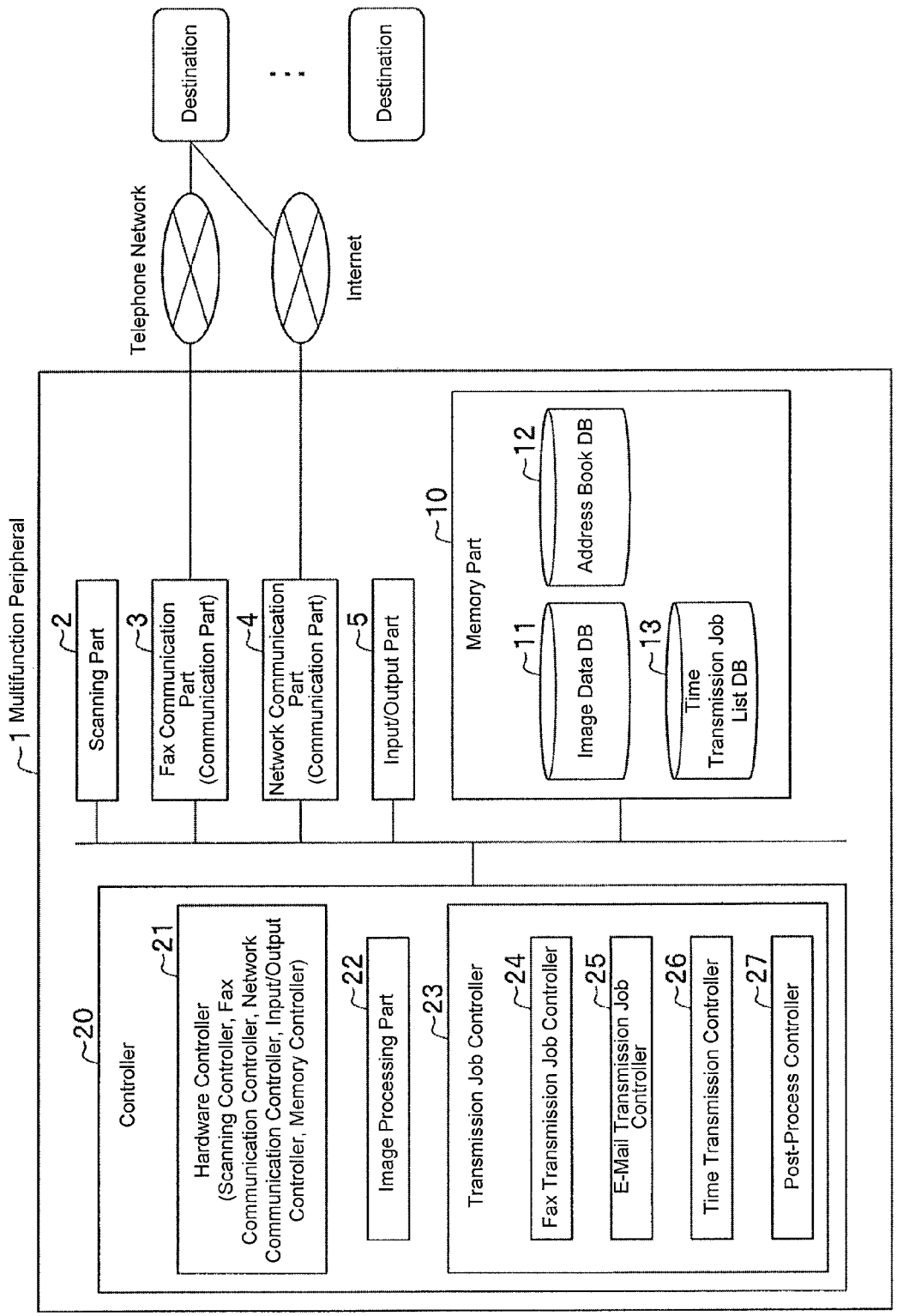
FIG. 1 is a configuration diagram of a multifunction peripheral according to a first embodiment of the present application.

Embodiments of the present application are described below in detail with reference to the drawings. Each drawing merely schematically illustrates the embodiments to allow sufficient understanding of the embodiments. Therefore, the embodiments are not limited to those shown in the drawings. In addition, in each drawing, common and similar components are marked with the same symbols, and duplicative explanations are omitted.

[First Embodiment]

<<Configuration of Multifunction Peripheral According to First Embodiment>>

A configuration of a multifunction peripheral according to a first embodiment of the present application is explained below with reference to FIG. 1. FIG. 1 is a configuration diagram of a multifunction peripheral 1 according to a first embodiment of the present application.

The multifunction peripheral 1 according to the first embodiment is a device, in which functions, such as a printer function, a scanner function, a facsimile (fax) function, an e-mail function, an internet fax function, and the like, are provided. Here, the multifunction peripheral 1 is explained as a device that includes the scanner function, the fax function and the e-mail function.

The multifunction peripheral 1 shown in FIG. 1 is configured by including a scanning part 2, a fax communication part 3, a network communication part 4, an input/output part 5 (display part), a memory part 10 and a controller 20. The input/output part of the invention might be realized as a part of display. For example using a touch panel. On the other hand. The input/output part and the display part might be separate parts.

The multifunction peripheral 1 is communicatably connected to a plurality of destinations through a telephone network and/or the internet. Here, the "destination" means an account destination, to and from which fax and e-mail are sent and received, and has at least one of a fax number and an e-mail address. The destination may have a plurality of fax numbers and a plurality of e-mail addresses. When the destination has a plurality of fax numbers, a fax transmission of any one of the plurality of fax numbers possessed by the destination is a transmission to the same destination. That is, the destination is a collection of fax numbers and e-mail addresses arbitrarily decided by the user of the multifunction peripheral 1 and may be formed by each company, office or department, for example. In this invention, any information that is useful to identify a destination, such as fax number, e-mail, phone number, speed dial number and a user name registered in a web site, are defined as communication destination information.

<Scanning Part>

The scanning part 2 reads a document (not shown) and generates image data in the RAW format (state before an image process).

<Fax Communication Part>

The fax communication part 3 (transmission part) performs a fax transmission/reception with the destination. More specifically, the fax communication part 3 transmits image data in the MMR format to a designated fax number through the telephone network.

<Network Communication Part>

The network communication part 4 (transmission part) performs e-mail transmission/reception with the destination. The network communication part 4 transmits e-mail with image data in the JPEG format as an attachment file to a designated e-mail address through the network.

<Input/Output Part>

The input/output part 5 displays information to and accepts operation by the user of the multifunction peripheral 1. The input/output part 5 is configured by a touch panel and a keyboard for character input.

<Memory Part>

The memory part 10 is configured by including an image data DB 11, an address book DB 12 as a communication destination information data base, and a time transmission job list DB 13.

(Image Data DB)

In the image data DB 11, the image data in the RAW format read by the scanning part 2 and image data in the RAW format that is image-processed into another format are saved. In the image data DB 11, the image data is saved with a number of pages as a file name in a directory with a job identification (ID) that uniquely identifies a transmission job (each job for transmitting fax and e-mail to a destination) as a directory name.

(Address Book DB)

FIG. 2A and 2B are data configuration diagrams for an address book DB 12 included in the multifunction peripheral 1 according to the first embodiment. Referring to FIG. 2A, the address book DB 12 is configured from 50 records, each of which is configured from a speed dial number 121, a fax number 122 and e-mail address 123.

The speed dial number 121, the fax number 122 and the e-mail address 123 are collectively called address information below. In addition, the fax number 122 and the e-mail address 123 are collectively called transmission destination information (or communication destination information). Moreover, in the present embodiment, because the multifunction peripheral 1 includes two transmission functions (methods) including the fax function and the e-mail function, the transmission destination information is configured from the fax number 122 and the e-mail address 123 that correspond to the respective transmission functions. However, when the multifunction peripheral 1 includes other transmission functions, the transmission destination information may be configured by including items that correspond to such transmission functions.

The speed dial number (identification information) is a number that uniquely specifies the transmission destination information (fax number 122 and e-mail address 123) in the multifunction peripheral 1 and is assigned with a number of 1 to 50. The fax number is used for the fax transmission by the fax communication part 3. For a domestic fax number, for example, a "OA-J fax number" is registered. The e-mail address is used for the e-mail transmission by the network communication part 4. For the e-mail address, a character string, for example, configured by a user name, a domain name and the like, is registered.

FIG. 2B shows a state after an update to add an e-mail address "aaa@bbb.com" to address information with the speed dial number 121 corresponds to "1" in FIG. 2A. The address information is updated by the user via an address information modification screen shown in FIG. 3.

Figure 3A:
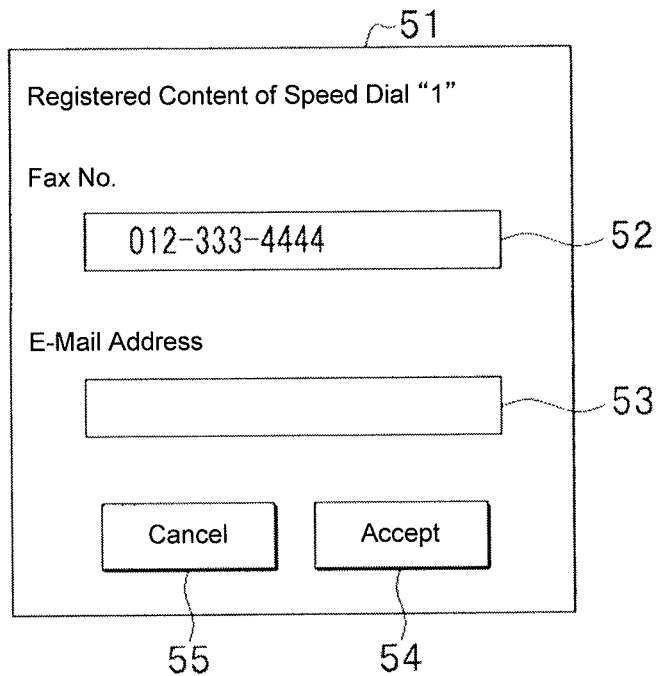
FIGS. 3A and 3B are explanatory diagrams for explaining an address information modification screen for modifying the address book DB included in the multifunction peripheral according to the first embodiment.
Figure 3B:
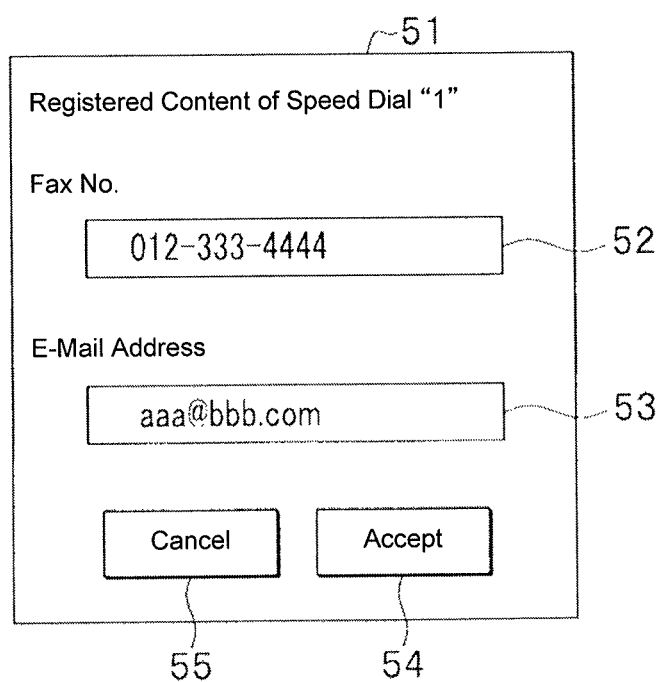

FIGS. 3A and 3B are explanatory diagrams for explaining an address information modification screen for modifying the address book DB 12 included in the multifunction peripheral 1 according to the first embodiment. Referring to FIG. 3A, the address information modification screen 51 is configured by text boxes 52 and 53, an Accept button 54 and a Cancel button 55.

Each of the text boxes 52 and 53 accepts an input of fax numbers and e-mail addresses and displays, in the initial state, the current address information that corresponds to a specified speed dial number 121 stored in the address book DB 12.

When the Accept button 54 is depressed, the fax number and e-mail address inputted in the address information modification screen 51 are accepted and are stored in the fax number 122 and the e-mail address 123 of the address book DB 12 that correspond to the specified speed dial number 121. When the Cancel button 55 is depressed, the content inputted in the address information modification screen 51 is cancelled, and the address information update process ends.

FIG. 3A shows the address information modification screen 51 for the address information with the speed dial number 121 of "1" in FIG. 2A. From the state shown in FIG. 3A, the e-mail address "aaa@bbb.com" is inputted to the text box 53 as shown in FIG. 3B, and the Accept button 54 is depressed. Then, the address information with the speed dial number 121 of "1" in the address book DB 12 is updated to the content shown in FIG. 2B.

Figure 4A:
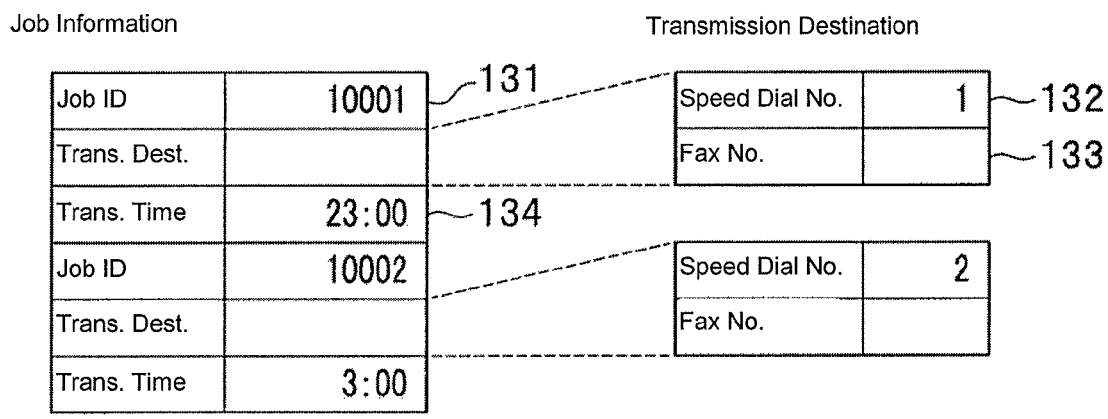
FIGS. 4A and 4B are data configuration diagrams for a time transmission job list DB included in the multifunction peripheral according to the first embodiment.
Figure 4B:
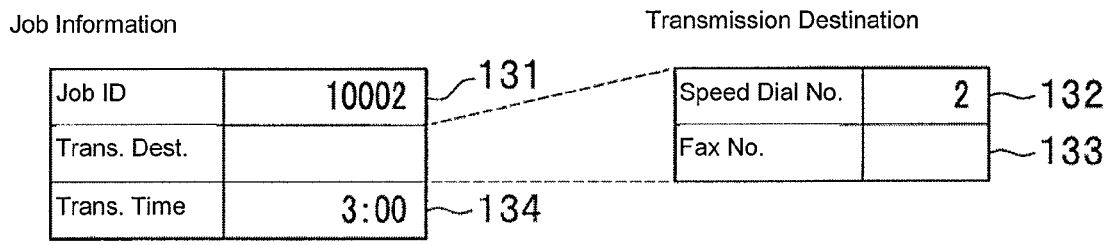

(Time Transmission Job List DB)
FIGS. 4A and 4B are data configuration diagrams for a time transmission job list DB 13 included in the multifunction peripheral 1 according to the first embodiment. Here, FIG. 4A is referenced, and FIG. 4B is referenced later.

For the time transmission job list DB 13, a record is added every time when a fax transmission job with time designation (hereinafter, called "time fax transmission job") is generated, and the record is deleted when the time fax transmission job is cancelled or completed. Therefore, the time transmission job list DB 13 is configured from a number of records for the currently generated time fax transmission jobs.

Referring to FIG. 4A, a record of the time transmission job list DB 13 is configured from a job ID 131, a transmission destination and a transmission time 134. The transmission destination is configured from the speed dial number 132 and the fax number 133. The job ID 131, the transmission designation and the transmission time 134 are collectively called job information below.

The job ID 131 is a number that uniquely specifies a time fax transmission job in the multifunction peripheral 1 and is assigned with an arbitrary number. To the transmission destination, information about the destination of the time transmission is registered. When a destination is designated by using a speed dial number when the user schedules a time fax transmission job, the speed dial number inputted in the section of the speed dial number 132 by the user via the input/output part 5 is registered, and no registration is made to the section of the fax number 133. On the other hand, when a transmission destination is designated by using a fax number, the fax number inputted in the section of the fax number 133 by the user via the input/output part 5 is registered, and no registration is made to the section of the speed dial number. To the transmission time 134 (transmission schedule time information), time to start the fax transmission based on the time fax transmission job is registered.

<Controller>
The controller 20 is configured by a central processing unit (CPU) and includes a hardware controller 21, an image processing part 22 and a transmission job controller 23. These functions are achieved by executing a program(s).

(Hardware Controller)
The hardware controller 21 includes a scanning controller, a fax communication controller, a network communication controller, an input/output controller, memory controller and the like that control hardware (scanning part 2, fax communication part 3, network communication part 4, input/output part 5 and memory part 10) included in the multifunction peripheral 1.

(Image Processing Part)
The image processing part 22 converts image data mutually in various formats, including the RAW format, MMR format and JPEG format.

(Transmission Job Controller)
The transmission job controller 23 includes a fax transmission job controller 24, an e-mail transmission job controller 25, a time transmission controller 26, and a post-process controller 27. The transmission job controller 23 performs the entire control of transmission jobs of image data using the fax communication part 3 and the network communication part 4 in the multifunction peripheral 1.

(Fax Transmission Job Controller)
The fax transmission job controller 24 controls fax transmission jobs executed by the multifunction peripheral 1. The fax transmission job is a job to convert image data in the RAW format read by the scanning part 2 into image data in the MMR format by the image processing part 22 and to transmit the converted image data by fax from the fax communication part 3. A fax transmission job that designates time is called a time fax transmission job.

(E-mail Transmission Job Controller)
The e-mail transmission job controller 25 controls e-mail transmission jobs for scan data executed by the multifunction peripheral 1. The e-mail transmission job for scan data is a job to convert image data in the RAW format read by the scanning part 2 into image data in the JPEG format by the image processing part 22 and to transmit the converted image data by e-mail from the network communication part 4. In the first embodiment, the e-mail transmission job is executed when switched from a time fax transmission job when the address information stored in the address book DB 12 is updated. Details are described later.

(Time Transmission Controller)

The time transmission controller 26 controls time fax transmission jobs, which are fax transmission jobs to transmit fax at designated time. When an instruction to execute a time fax transmission job is received from the user via the input/output part 5, the time transmission controller 26 stores image data in the image data DB 11 of the memory 10 after converting the image data in the RAW format read by the scanning part 2 into image data in the MMR format using the image processing part 22, and registers job information to the time transmission job list DB 13.

In addition, the time transmission controller 26 instructs the fax transmission job controller 24 to transmit the image data stored in the image data DB 11 of the memory 10 to the transmission destination by fax at the designated time. For the fax transmission, when the speed dial number 132 is set for the transmission designation of the job information, a fax number that corresponds to the speed dial number is used. When the fax number 133 is set, that fax number is used.

In addition, when a switch to an e-mail transmission is instructed from the later-discussed post-process controller 27, the time transmission controller 26 instructs the e-mail transmission job controller 25 to transmit, to the designated transmission destination, the image data in the MMR format stored in the image data DB 11 of the memory 10 by e-mail.

When the fax transmission and e-mail transmission are completed, the time transmission controller 26 deletes the image data from the image data DB 11 of the memory 10 and the job information in the time transmission job list DB 13. In addition, the time transmission controller 26 records results of time fax transmission jobs and e-mail transmission jobs are a log in a region (not shown) of the memory 10. Job IDs, transmission parts and transmission results are recorded in the log.

(Post-process Controller)

The post-process controller 27 matches job information in the time transmission job list DB 13 with a key of the speed dial number 121 for updated address information when the address information stored in the address book DB 12 is updated and searches a time fax transmission job for which the keyed speed dial is set to the speed dial number 132.

Then, when there are matched transmission jobs, the post-process controller 27 displays a selection of processes to the matched time fax transmission jobs on the input/output part 5 to allow the user of the multifunction peripheral 1 to decide the process. The display of the selection of processes by the post-process controller 27 is performed using a correspondence table shown in FIG. 5. FIG. 5 is an explanatory diagram for explaining a correspondence table that summarizes options for processes for a time fax transmission job executed by the multifunction peripheral 1 according to the first embodiment.

The correspondence table shown in FIG. 5 that summarizes the selection of processes is only an example and is not limited to that shown in FIG. 5 as long as it allows (1) assuming (determining), depending on how the address is updated (update pattern), whether the update of address information is for another destination or for the same destination, and (2) selecting (limiting) a process that may be performed on the time fax transmission job based on the assumption (determination). Here, the same destination means a destination to which the pre-update address information corresponds when the update of the address information is performed. On the other hand, another destination means a destination to which the pre-update address information does not correspond when the update of the address information is performed. Also, a pre-update destination is defined as a communication destination that has been stored in the communication designation information database after the latest update was performed. An original destination which is stored at its shipping is also referred to the pre-update destination. On the other hand, a post-update destination is defined as a communication destination that will be stored when an update is performed.

Determination as to whether or not the same destination, or whether or not another destination For example, when both the fax number 122 and the e-mail address 123 are updated, it is assumed (determined) that address information of another destination is assigned to the speed dial number 121. On the other hand, when one of the fax number 122 and the e-mail address 123 is updated, it is assumed (determined) that address information for the same destination is updated.

Here, the phrase "when both the fax number 122 and the e-mail address 123 are updated" corresponds to a case where both of the fax number 122 and the e-mail address 123 are added, changed, deleted or the like. Sections in the correspondence table shown in FIG. 5 with diagonal lines correspond to this case.

In addition, the phrase "when one of the fax number 122 and the e-mail address 123 is updated" corresponds to a case where one of the fax number 122 and the e-mail address 123 is added, changed, deleted or the like. Darkened sections in the correspondence table shown in FIG. 5 correspond to this case.

Selection of process that may be performed on transmission job

The processes that may be performed on the time fax transmission job without "(1) Determination as to whether or not the same destination, or whether or not another destination" as discussed above may be "setting post-update address information (fax number 122 or e-mail address 123) as transmission destination," "setting pre-update address information as transmission destination," and "deleting fax transmission job."

The following are five ways of representing these processes to the user of the multifunction peripheral 1 for easy understanding, for example:

"A: Switch to e-mail transmission and transmit e-mail (by setting the post or pre-update e-mail address as the transmission destination);"

"B: Change destination to post-update fax number (by setting the post-update fax number being as the transmission destination);"

"C: Retain fax number at time of scheduling (by updating the fax number but by setting the pre-update fax number as the transmission destination);"

"D: Cancel schedule (by deleting the time fax transmission job);"

"-: No change (by setting the pre-update fax number as the transmission destination as the fax number has not been updated)."

Next, the processes that may be performed on the time fax transmission job when determined as another destination upon "(1) Determination as to whether or not the same destination, or whether or not another destination" as discussed above may be "setting post-update address information (fax number 122 or e-mail address 123) to transmission destination" and "deleting fax transmission job." This is because it is difficult to consider that the image data that is supposed to be sent to a destination is to be sent to another destination. Therefore, the process to change the post-update address information to the transmission destination is eliminated.

On the other hand, the processes that may be performed on the time fax transmission job when determined as the same destination upon "(1) Determination as to whether or not the same destination, or whether or not another destination" as discussed above may be "setting post-update address information (fax number 122 or e-mail address 123) to transmission destination" and "setting pre-update address information to transmission destination." This is because that it is difficult to consider that, for the image data that is supposed to be transmitted to a destination, the fax transmission job is cancelled while the address information of the transmission destination is registered.

That is, the processes in the above-described five ways represented to the user of the multifunction peripheral 1 for easy understanding are limited to the processes shown in FIG. 5 based on the update patterns of the address information by performing "(1) Determination as to whether or not the same destination, or whether or not another destination" as discussed above.

Referring to FIG. 5, when the fax number is changed and when the e-mail address is added, changed or deleted, for example, it is determined that the post-update address information is for another destination. Therefore, the process "C: Retain fax number at time of scheduling" or "D: Cancel schedule" is performed.

In addition, when the e-mail address is added while the fax number is unchanged, it is determined that the post-update address information is for the same destination. Therefore, the process "A: Switch to e-mail transmission and transmit e-mail" or "-: No change" is performed.

Moreover, when the fax number is changed while the registered e-mail address is unchanged, it is determined that the post-update address information is for the same destination. Therefore, the process "B: Change to post-update fax number" or "C: Retain fax number at time of scheduling" is performed.

Then, the post-process controller 27 displays on the input/output part 5 the selections of the process for the time fax transmission job based on the correspondence table shown in FIG. 5. An example of a process selection screen that the post-process controller 27 displays on the input/output part 5 is shown in FIG. 6. FIG. 6 is an explanatory diagram for explaining a process selection screen 61 that displays the options for the processes for the time fax transmission job executed by the multifunction peripheral 1 according to the first embodiment.

Referring to FIG. 6, the process selection screen 61 is configured from a button 62 that corresponds to the process "A" in the correspondence table shown in FIG. 5, a button 63 that corresponds to the process "B", a button 64 that corresponds to the process "C", a button 65 that corresponds to the process "D" and a button 66 that corresponds to the process "-".

In FIG. 6, the buttons 63, 64 and 65 are darkened and are not to be selected. This is because the process selection screen 61 in FIG. 6 represents a case where the fax number in the correspondence table in FIG. 5 is updated and the e-mail address is added. As a result, in the process selection screen 61, only the processes that are selected based on the correspondence table shown in FIG. 5 are displayed as selectable by the user.

When the buttons 62, 63, 64, 65 and 66 are depressed by the user while the buttons 62, 63, 64, 65 and 66 are displayed as selectable, the post-process controller 27 performs the following processes. When the button 62 is depressed by the user, the post-process controller 27 notifies the time transmission controller 26 that switching from the fax transmission to the e-mail transmission is selected. When the button 63 is depressed by the user, the post-process controller 27 does not substantially perform any process. This is because the fax number 122 of the transmission destination read from the address book DB 12 with the speed dial number as a key at the time of fax transmission is a post-update fax number.

When the button 64 is depressed, the post-process controller 27 empties the speed dial number 132 of the job information in the time transmission job list DB 13 and sets the pre-update fax number to the fax number 133 of the job information. When the button 65 is depressed by the user, the post-process controller 27 deletes the job information related to the time fax transmission job from the time transmission job list DB 13. When the button 66 is depressed by the user, the post-process controller 27 does not substantially perform any process. Explanation of the configuration of the multifunction peripheral 1 according to the first embodiment is completed.

<<Operation Performed when Address Information is Updated in Multifunction Peripheral According to First Embodiment>>

A process for the time fax transmission job performed when the address information is updated in the multifunction peripheral 1 according to the first embodiment is explained below with reference to the flow diagrams in FIGS. 7 and 8.

Figure 7:
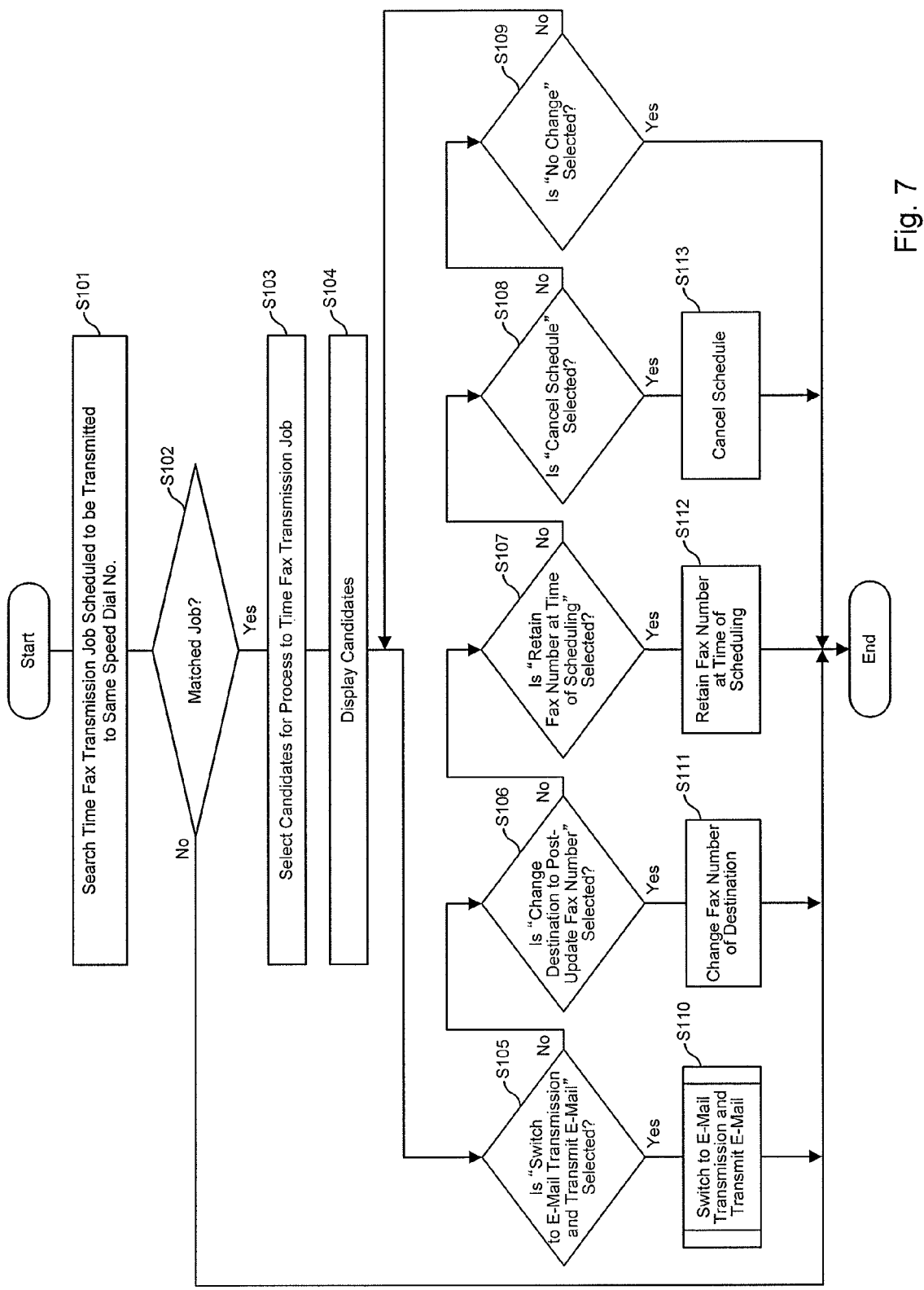
FIG. 7 is a flow diagram (global) for explaining the process for the time fax transmission job executed by the multifunction peripheral according to the first embodiment.

First, as show in the flow diagram in FIG. 7, when the address information registered in the address book DB 12 is updated, the post-process controller 27 matches updated address information with the job information in the time transmission job list DB 13 based on the speed dial number 121 of the updated address information as a key and searches a time fax transmission job for which the keyed speed dial number is set to the speed dial number 132 (S101).

Next, based on the search at S101, the post-process controller 27 determines whether or not there is a matched time fax transmission job (S102). When it is determined that there is a matched time fax transmission job (Yes, S102), the process moves to S103. On the other hand, when it is determined that there is no matched time fax transmission job (No, S102), the process ends.

Next, from the content of the update performed on the address information, the post-process controller 27 selects candidates for the process (operation) to the time fax transmission job in accordance with the correspondence table shown in FIG. 5 (S103).

Then, the post-process controller 27 displays the candidates for the process selected for the time fax transmission job at S103, on the input/output part 5 as the process selection screen 61 shown in FIG. 6 (S104).

Next, the post-process controller 27 determines whether or not the button 62 for "A: Switch to e-mail transmission and transmit the e-mail" in the process selection screen 61 is selected by the user via the input/output part 5 (S105). When it is determined that the process "A" is selected (Yes, S105), the process moves to S110. On the other hand, when it is determined that the process "A" is not selected (No, S105), the process moves to S106.

In case of No at S105, the post-process controller 27 subsequently determines whether or not the button 63 for "B: Change destination to post-update fax number" in the process section screen 61 is selected by the user via the input/output part 5 (S106). When it is determined that the process "B" is selected (Yes, S106), the process moves to S111. On the other hand, when it is determined that the process "B" is not selected (No, S106), the process moves to S107.

In case of No at S106, the post-process controller 27 subsequently determines whether or not the button 64 for "C: Retain fax number at time of scheduling" in the process section screen 61 is selected by the user via the input/output part 5 (S107). When it is determined that the process "C" is selected (Yes, S107), the process moves to S112. On the other hand, when it is determined that the process "C" is not selected (No, S107), the process moves to S108.

In case of No at S107, the post-process controller 27 subsequently determines whether or not the button 65 for "D: Cancel the schedule" in the process section screen 61 is selected by the user via the input/output part 5 (S108). When it is determined that the process "C" is selected (Yes, S108), the process moves to S113. On the other hand, when it is determined that the process "D" is not selected (No, S108), the process moves to S109.

In case of No at S108, the post-process controller 27 subsequently determines whether or not the button 66 for "-: No change" in the process section screen 61 is selected by the user via the input/output part 5 (S109). When it is determined that the process "-" is selected (Yes, S109), the process ends. On the other hand, when it is determined that the process "-" is not selected (No, S109), the process returns to S105.

In case of Yes at S105, the post-controller 27 subsequently notifies the time transmission controller 26 that switching from the fax transmission to the e-mail transmission is selected. Then, the time transmission controller 26 instructs the e-mail transmission job controller 25 for an e-mail transmission to switch from the fax transmission to the e-mail transmission (S110). Details of the process at S110 are described later.

In case of Yes at S106, the process to change the fax number of the transmission destination (S111) needs to be performed next. However, no substantial process is performed. It is because the fax number of the transmission destination read from the address book DB 12 with the speed dial number as a key at the time of fax transmission is the post-update fax number.

In case of Yes at S107, the time transmission controller 26 subsequently empties the speed dial number 132 of the job information in the time transmission job list DB 13 and sets the pre-update fax number to the fax number 133 of the job information, in order to retain the fax number at the time of scheduling (S112).

In case of Yes at S108, the time transmission controller 26 subsequently deletes the job information related to the fax transmission job from the time transmission job list DB 13 of the memory 10, in order to cancel the scheduling (S113).

Next, details of the process at S110 are explained with reference to FIG. 8. FIG. 8 is a flow diagram (a case where a switch to e-mail transmission is selected as a selection) for explaining the process for the time fax transmission job executed by the multifunction peripheral 1 according to the first embodiment.

Figure 8:
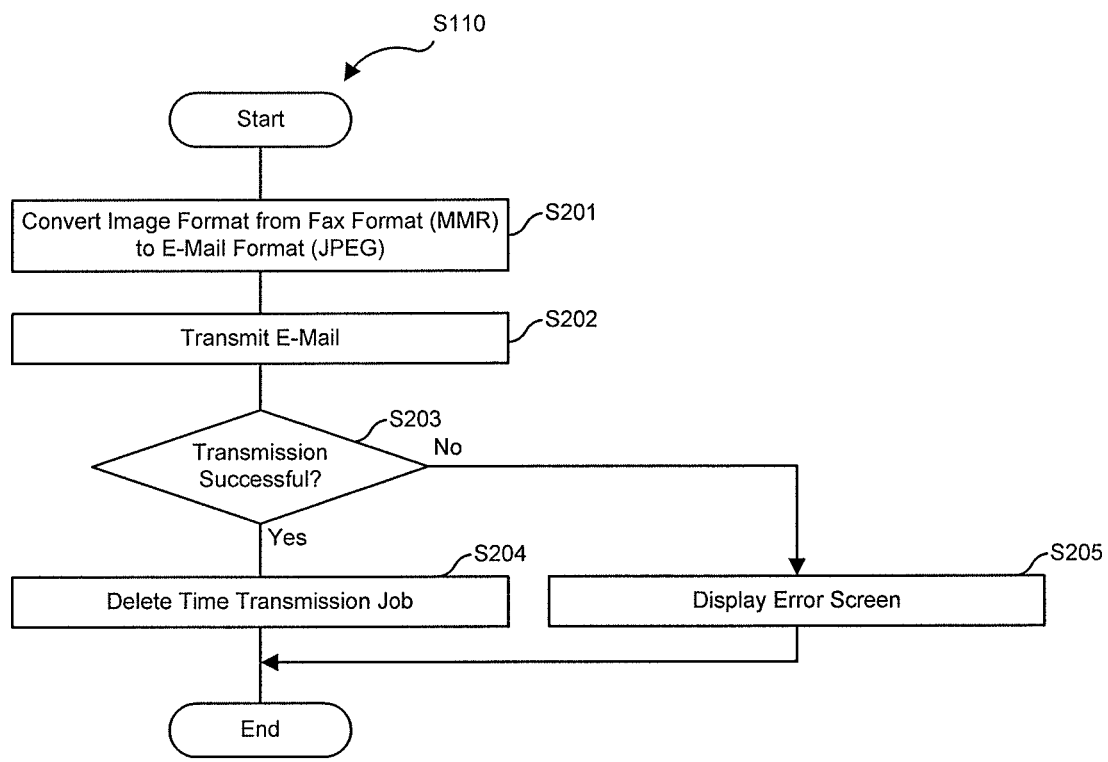
FIG. 8 is a flow diagram (when a switch to e-mail transmission is selected as a selection) for explaining the process for the time fax transmission job executed by the multifunction peripheral according to the first embodiment.

Referring to FIG. 8, the e-mail transmission job controller 25 first converts the image data in the MMR format stored in the image data DB 11 of the memory 10 into the JPEG format using the image processing part 22. The image data converted into the JPEG format is stored in the image data DB 11 of the memory 10 (S201).

Next, the e-mail transmission job controller 25 generates a header and main text of the e-mail and transmits the e-mail to the post-update e-mail address with the image data converted into the JPEG format at S201 as an attachment file (S202). In addition, the e-mail transmission job controller 25 deletes the image data converted into the JPEG format and stored at S201 from the image data DB 11 of the memory 10 after the transmission of the e-mail.

Then, the time transmission controller 26 determines whether or not the transmission of the e-mail at S202 was successful (S203). When it is determined that the transmission of the e-mail was successful (Yes, S203), the process moves to S204. On the other hand, when it was not determined that the transmission of the e-mail was successful (No, S203), the process moves to S205.

In case of Yes at S203, the time transmission controller 26 deletes the job information related to the time transmission job transmitted from the time transmission job list DB 13 of the memory 10 (S204). In addition, the time transmission controller 26 records in the memory 10 as a log that the transmission of the e-mail transmission job was successful and that the scheduled job (time fax transmission job) is switched to the e-mail transmission job.

In case of No at S203, the time transmission controller 26 displays on the input/output part 5 an "error screen" that shows that the transmission of the e-mail failed (S205). In addition, the time transmission controller 26 records "transmission failure" for the e-mail transmission job as a log in the memory 10.

Below, the operation of FIGS. 7 and 8 is described with a case where the address information for the speed dial number of "1" in the address book DB 12 is changed as shown in FIG. 2B from a state shown in FIG. 2A while the time transmission job list DB 13 is registered as shown in FIG. 4A, as an example.

When the address information shown in FIG. 2A is updated as shown in FIG. 2B, the post-process controller 27 searches, from the time transmission job list DB 13, a job for which the speed dial number for the transmission destination is set to "1" and, as a result, extracts a job with job ID "10001" (S101). Because there is such a job, the process moves to S103 (S102).

Next, the post-process controller 27 selects, as display selections, "A: Switch to e-mail transmission and transmit e-mail" and "-: No change" from the correspondence table shown in FIG. 5 (S103) and displays the process selection screen 61 (see FIG. 6) for the time fax transmission job shown in FIG. 4A on the input/output part 5 (S104).

Then, when the button 62 in the process selection screen 61 is depressed and "A: Switch to e-mail transmission and transmit e-mail" is selected by the user of the multifunction peripheral 1, the process moves to S110 (S105). Next, the time transmission controller 26 switches from the fax transmission to the e-mail transmission (S110).

When the e-mail transmission is successful, the time transmission controller 26 deletes the job information for the job ID "10001" from the time transmission job list DB 13 (S204). The job information in the time transmission job list DB 13 turns to the state shown in FIG. 4B. This completes the explanation of the operation performed when the address information is updated in the multifunction peripheral according to the first embodiment.

<<Advantage of Multifunction Peripheral According to First Embodiment>>

As described above, according to the first embodiment, the reason for changing the address information is determined when the address information (fax number, e-mail address) being used as a time fax transmission job is updated. In addition, with the above-described determination, a selection selected in response to the content of the change is proposed to the user. As a result, the user is able to select the process for the scheduled fax transmission job from the limited selection.

Moreover, because the switching from the fax transmission to the e-mail transmission is allowed in response to the content of the change, a process desired by the user, such as reducing a telephone charge generated in accordance with the fax transmission, can be easily selected.

<<Other Configuration of Multifunction Peripheral of First Embodiment>>

In the first embodiment, the switching from the schedule fax transmission job to the e-mail transmission job is explained. However, instead of the switching from the fax transmission job to the e-mail transmission job, the switching may be performed from the e-mail transmission job to the fax transmission job. As a result, the switching from the e-mail transmission job to the fax transmission job is easily performed.

[Second Embodiment]

<<Outline>>

In the multifunction peripheral 1 according to the first embodiment, the switching from the fax transmission to the e-mail transmission is simply performed by providing the user a selection that is selected in response to a content of change when the address information used as the time fax transmission job is changed. In addition, the other configuration of the multifunction peripheral 1 according to the first embodiment allows simple switching from the e-mail transmission to the fax transmission.

A multifunction peripheral 1a according to the second embodiment includes both the function to switch from the fax transmission to the e-mail transmission indicated as the configuration of the first embodiment and the function to switch from the e-mail transmission to the fax transmission indicated as an alternative configuration of the first embodiment. In addition, the multifunction peripheral 1a according to the second embodiment is capable of reconfiguring the transmission start time for the scheduled transmission job.

<<Configuration of Multifunction Peripheral According to Second Embodiment>>

Figure 9:
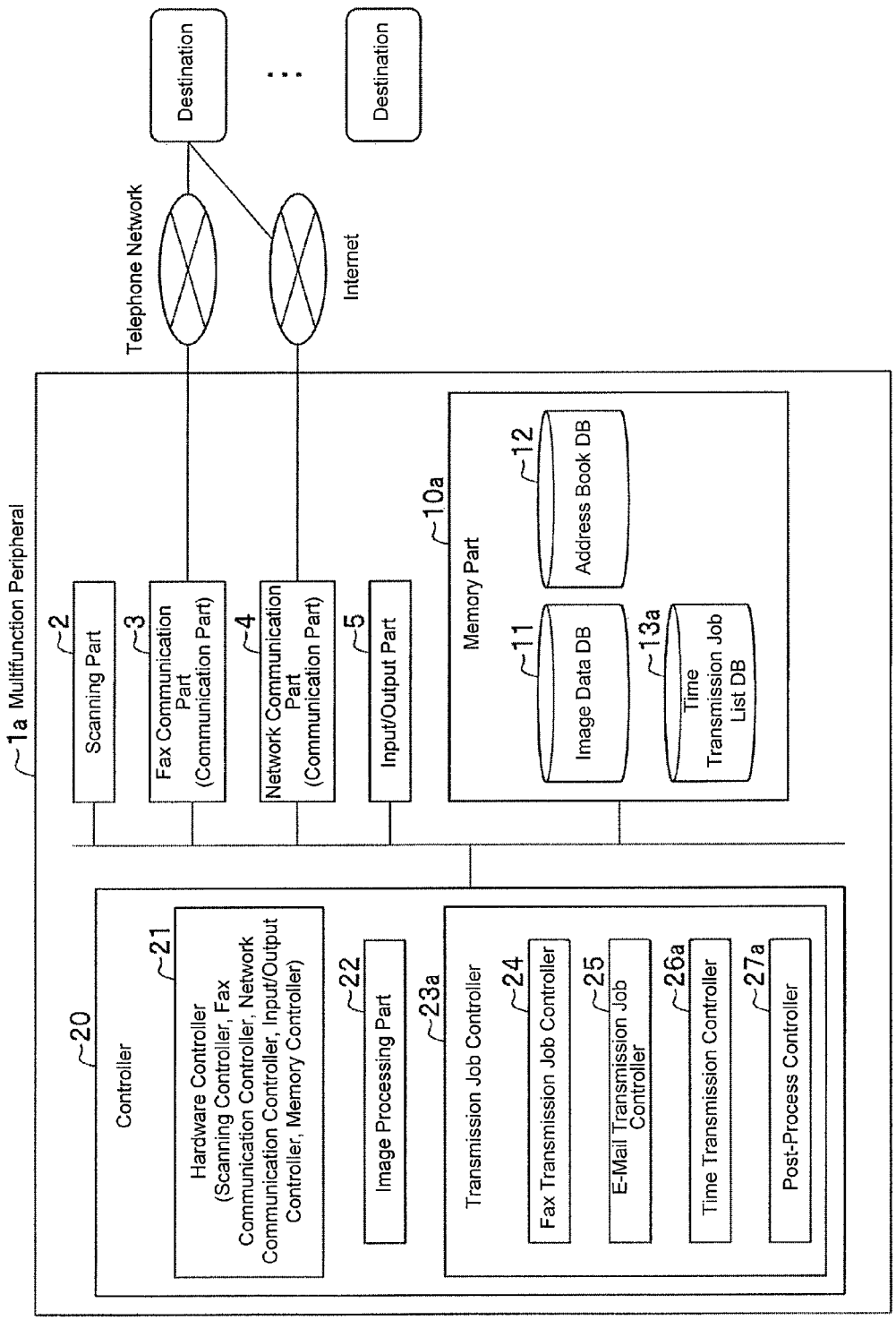
FIG. 9 is a configuration diagram of the multifunction peripheral according to a second embodiment of the present application.

A configuration of a multifunction peripheral according to a second embodiment of the present application is explained below with reference to FIG. 9. FIG. 9 is a configuration diagram of the multifunction peripheral 1a according to a second embodiment of the present application.

Differences between the configuration of the multifunction peripheral 1a according to the second embodiment and the configuration of the multifunction peripheral 1 according to the first embodiment are a time transmission job list DB 13a, a time transmission controller 26a and a post-process controller 27a.

(Time Transmission Job List DB)

Figure 10A:
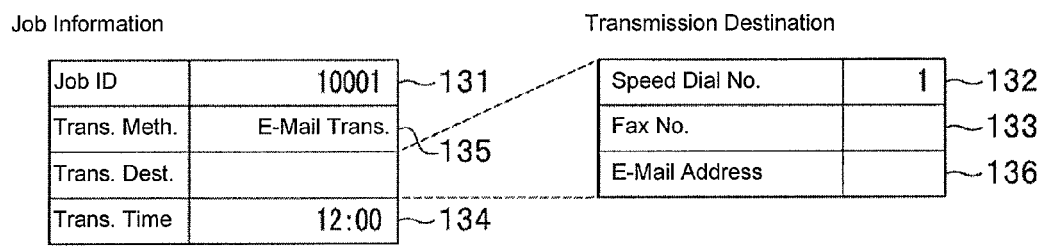
FIGS. 10A and 10B are data configuration diagrams for a time transmission job list DB included in the multifunction peripheral according to the second embodiment.
Figure 10B:
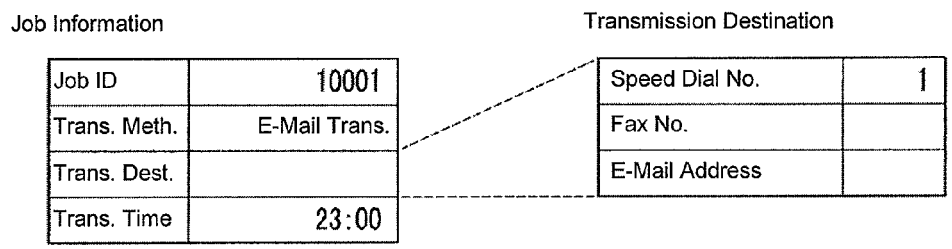

FIGS. 10A and 10B are data configuration diagrams for the time transmission job list DB included in the multifunction peripheral 1a according to the second embodiment. Here, FIG. 10A is referenced, and FIG. 10B is referenced later.

The time transmission job list DB 13a includes, in addition to the configuration of the time transmission job list DB 13 of the first embodiment shown in FIG. 4A, a transmission method 135, and an e-mail address 136 as the transmission destination. The transmission method 135 (communication method information) is information related to a transmission method that designates the e-mail transmission or the fax transmission. To the destination, the speed dial number 132 is set when a speed dial number is registered, the fax number 133 is set when a fax number is directly inputted, and the e-mail address 136 is set when the e-mail address is directly inputted. Values of the speed dial number, fax number and e-mail address that are not used are kept blank.

(Time Transmission Controller)

The time transmission controller 26a controls time e-mail transmission jobs, which are e-mail transmission jobs that designate time for transmission, and switches from the time e-mail transmission jobs to fax transmission jobs, in addition to performing the function of the time transmission controller 26 according to the first embodiment.

When an instruction to execute a time e-mail transmission job is received from the user via the input/output part 5, the time transmission controller 26a stores image data in the image data DB 11 of the memory 10a after converting the image data in the RAW format read by the scanning part 2 into image data in the JPEG format using the image processing part 22, and registers job information to the time transmission job list DB 13a.

In addition, the time transmission controller 26a instructs the e-mail transmission job controller 25 to transmit the image data stored in the image data DB 11 of the memory 10a to the transmission destination by e-mail at the designated time. For the e-mail transmission, when the speed dial number 132 is set for the transmission designation of the job information, an e-mail address that corresponds to the speed dial number is used. When the e-mail address 136 is set, that e-mail address is used.

In addition, when a switch to an e-mail transmission is instructed from the later-discussed post-process controller 27a, the time transmission controller 26a instructs the fax transmission job controller 24 to transmit, to the designated transmission destination, the image data in the JPEG format stored in the image data DB 11 of the memory 10a by fax.

When the fax transmission and e-mail transmission are completed, the time transmission controller 26a deletes the image data from the image data DB 11 of the memory 10a and the job information in the time transmission job list DB 13a. In addition, the time transmission controller 26a records results of fax transmission jobs and time e-mail transmission jobs are a log in a region (not shown) of the memory 10a. Job IDs, transmission parts and transmission results are recorded in the log.

(Post-Process Controller)

In addition to the function of the post-process controller 27 according to the first embodiment, the post-process controller 27a displays a selection of processes to the matched time e-mail transmission jobs on the input/output part 5 to allow the user of the multifunction peripheral 1a to decide the process. The display of the selection of processes by the post-process controller 27a is performed using a correspondence table shown in FIG. 11. FIG. 11 is an explanatory diagram for explaining a correspondence table that summarizes options for processes for a time e-mail transmission job executed by multifunction peripheral 1a according to the second embodiment.

As shown in FIG. 11, a plurality of processes for the time e-mail transmission job are selected from the following 5 selections:

"a: Switch to fax transmission and transmit fax (by setting the post or pre-update fax number as the transmission destination);"

"b: Change destination to post-update e-mail address (by setting the post-update e-mail address as the transmission destination);"

"c: Retain e-mail address at time of scheduling (by updating the e-mail address but by setting the pre-update e-mail address as the transmission destination);"

"d: Cancel schedule (by deleting the time e-mail transmission job);"

"-: No change (by setting the pre-update e-mail address as the transmission destination as the e-mail address has not been updated)."

Figure 12:
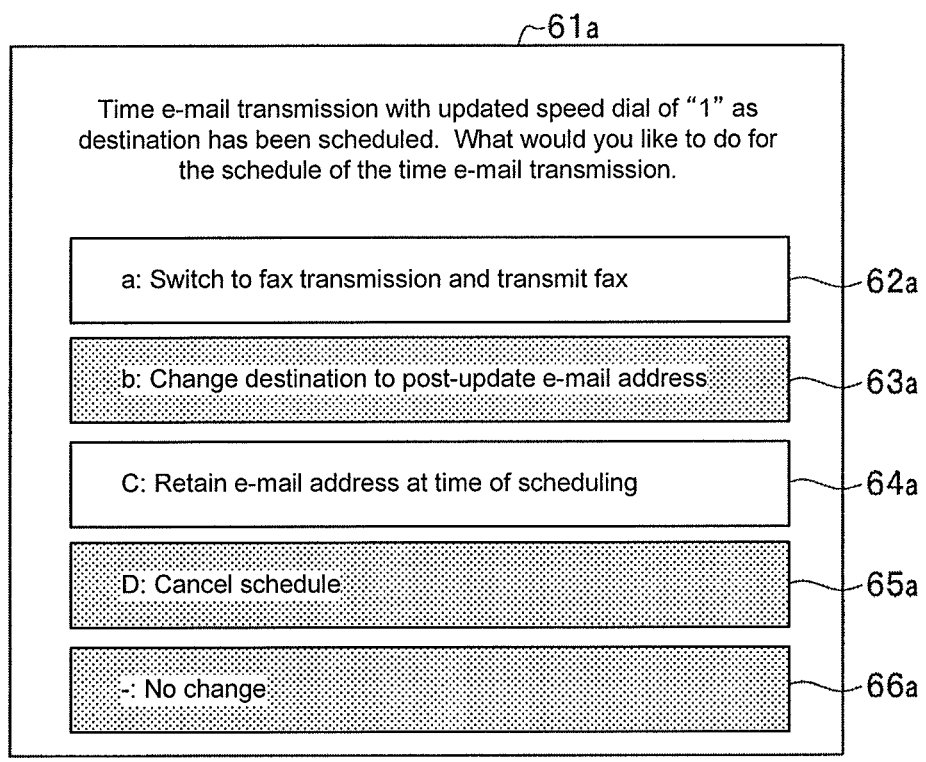
FIG. 12 is an explanatory diagram for explaining a process selection screen that displays the options for the processes for the time e-mail transmission job executed by the multifunction peripheral according to the second embodiment.

Then, the post-process controller 27*a* displays on the input/output part 5 the selections of the process for the time e-mail transmission job based on the correspondence table shown in FIG. 11. An example of a process selection screen that the post-process controller 27*a* displays on the input/output part 5 is shown in FIG. 12. FIG. 12 is an explanatory diagram for explaining a process selection screen that displays the options for the processes for the time e-mail transmission job executed by the multifunction peripheral 1*a* according to the second embodiment. This completes the explanation of the configuration of the multifunction peripheral 1*a* according to the second embodiment.

<<Operation Performed when Address Information is Updated in Multifunction Peripheral According to Second Embodiment>>

A process for the time e-mail transmission job performed when the address information is updated in the multifunction peripheral 1*a* according to the second embodiment is explained below with reference to the flow diagrams in FIGS. 14 to 16.

Figure 14:
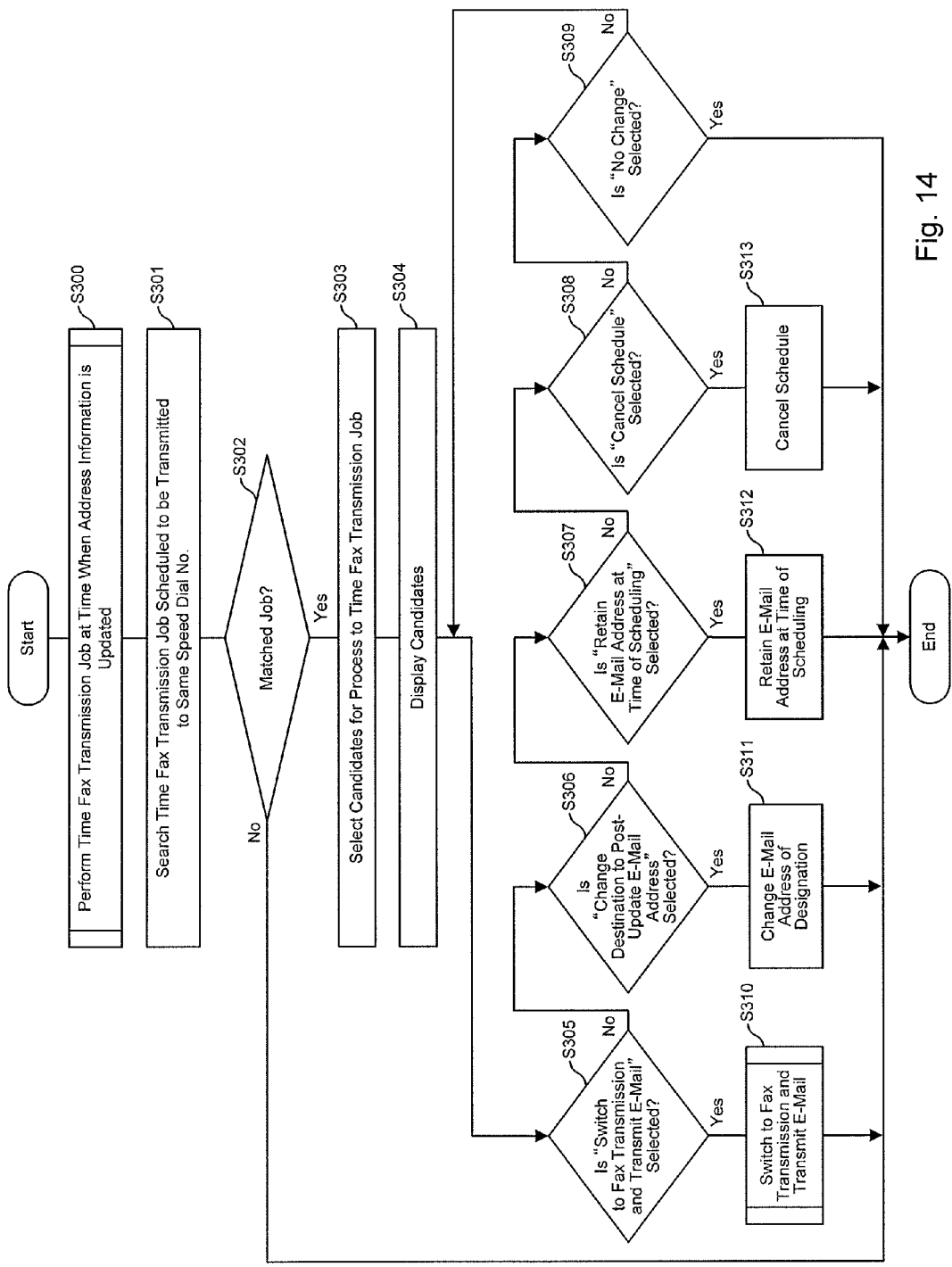
FIG. 14 is a flow diagram (global) for explaining the process for the time e-mail transmission job executed by the multifunction peripheral according to the second embodiment.

First, referring to FIG. 14, the post-process controller 27*a* performs a process for the time fax transmission job shown in FIG. 7 as explained in the first embodiment, when the address information registered in the address book DB 12 is updated (S300).

Next, the post-process controller 27*a* matches updated address information with the job information in the time transmission job list DB 13*a* based on the speed dial number 121 of the updated address information as a key and searches a time e-mail transmission job for which the keyed speed dial number is set to the speed dial number 132 (S301).

Next, based on the search at S301, the post-process controller 27*a* determines whether or not there is a matched time e-mail transmission job (S302). When it is determined that there is a matched time e-mail transmission job (Yes, S302), the process moves to S303. On the other hand, when it is determined that there is no matched time e-mail transmission job (No, S302), the process ends.

Next, from the content of the update performed on the address information, the post-process controller 27*a* selects candidates for the process (operation) to the time e-mail transmission job in accordance with the correspondence table shown in FIG. 11 (S303).

Then, the post-process controller 27*a* displays the candidates for the process selected for the time e-mail transmission job at S303, on the input/output part 5 as the process selection screen 61*a* shown in FIG. 12 (S304).

Next, the post-process controller 27*a* determines whether or not the button 62*a* for "a: Switch to fax transmission and transmit fax" in the process selection screen 61*a* is selected by the user via the input/output part 5 (S305). When it is determined that the process "a" is selected (Yes, S305), the process moves to S310. On the other hand, when it is determined that the process "a" is not selected (No, S305), the process moves to S306.

In case of No at S305, the post-process controller 27*a* subsequently determines whether or not the button 63*a* for "b: Change destination to post-update e-mail address" in the process section screen 61*a* is selected by the user via the input/output part 5 (S306). When it is determined that the process "b" is selected (Yes, S306), the process moves to S311. On the other hand, when it is determined that the process "b" is not selected (No, S306), the process moves to S307.

In case of No at S306, the post-process controller 27*a* subsequently determines whether or not the button 64*a* for "c: Retain e-mail address at time of scheduling" in the process section screen 61*a* is selected by the user via the input/output part 5 (S307). When it is determined that the process "c" is selected (Yes, S307), the process moves to S312. On the other hand, when it is determined that the process "c" is not selected (No, S307), the process moves to S308.

In case of No at S307, the post-process controller 27*a* subsequently determines whether or not the button 65*a* for "d: Cancel schedule" in the process section screen 61*a* is selected by the user via the input/output part 5 (S308). When it is determined that the process "d" is selected (Yes, S308), the process moves to S313. On the other hand, when it is determined that the process "d" is not selected (No, S308), the process moves to S309.

In case of No at S308, the post-process controller 27*a* subsequently determines whether or not the button 66*a* for "-: No change" in the process section screen 61*a* is selected by the user via the input/output part 5 (S309). When it is determined that the process "-" is selected (Yes, S309), the process ends. On the other hand, when it is determined that the process "-" is not selected (No, S309), the process returns to S305.

In case of Yes at S305, the post-controller 27*a* subsequently notifies the time transmission controller 26*a* that switching from the e-mail transmission to the fax transmission is selected. Then, the time transmission controller 26*a* instructs the fax transmission job controller 24 for a fax transmission to switch from the e-mail transmission to the fax transmission (S310). Details of the process at S310 are described later.

In case of Yes at S306, the process to change the e-mail address of the transmission destination (S311) needs to be performed next. However, no substantial process is performed. It is because the e-mail address of the transmission destination read from the address book DB 12 with the speed dial number as a key at the time of e-mail transmission is the post-update e-mail address.

In case of Yes at S307, the time transmission controller 26*a* subsequently empties the speed dial number 132 of the job information in the time transmission job list DB 13*a* and sets the pre-update e-mail address to the e-mail address 136 of the job information, in order to retain the e-mail address at the time of scheduling (S312).

In case of Yes at S308, the time transmission controller 26*a* subsequently deletes the job information related to the e-mail transmission job from the time transmission job list DB 13*a* of the memory 10*a*, in order to cancel the scheduling (S313).

Next, details of the process at S310 are explained with reference to FIGS. 15 and 16. Referring to FIG. 15, the post-process controller 27*a* first displays, on the input/output part 5, a transmission time designation screen shown in FIG. 13 (S401) and accepts a designation of the transmission time.

The time transmission controller 26*a* converts the image data saved in the JPEG format into the MMR format using the image processing part 22 (S402). The image data converted into the MMR format is stored in the memory 10*a*.

The time transmission controller 26*a* updates the transmission method 135 for the job information registered in the time transmission job list DB 13*a* to "fax transmission" and updates the transmission time 134 to the time inputted via the transmission time designation screen at S401 (S403).

Figure 16:
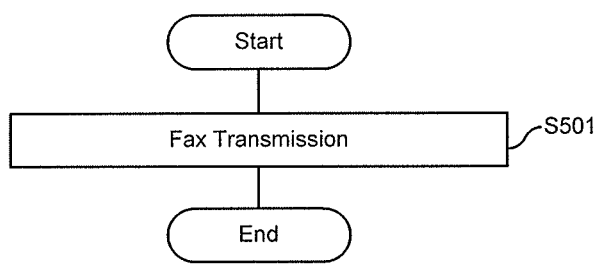
FIG. 16 is a flow diagram (a second case where a switch to e-mail transmission is selected as a selection) for explaining the process for the time e-mail transmission job executed by the multifunction peripheral according to the second embodiment.

Next, referring to FIG. 16, the time transmission controller 26*a* instructs the fax transmission job controller 24 to perform fax transmission at the time set at the transmission time 134 for the job information registered in the time transmission job list DB 13*a*. Then, the fax transmission job controller 24 transmits, by fax, the image data in the MMR format converted at S404 to the post-update fax number.

Figure 15:
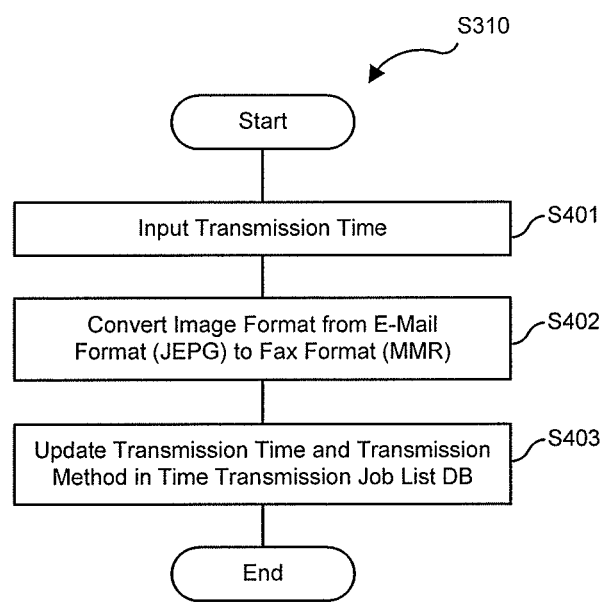
FIG. 15 is a flow diagram (a first case where a switch to e-mail transmission is selected as a selection) for explaining the process for the time e-mail transmission job executed by the multifunction peripheral according to the second embodiment.

Below, the operation of FIGS. 14 to 16 is described with a case where the address information for the speed dial number of "1" in the address book DB 12 is changed as shown in FIG. 2A from a state shown in FIG. 2B while the time transmission job list DB 13a is registered as shown in FIG. 10A, as an example.

The post-process controller 27a searches a time designated fax transmission job that uses the speed dial number of "1" from the time transmission job list DB 13a. Because there is no such job, the time transmission fax process for which the address information has been updated (S300).

Next, the post-process controller 27a searches, from the time transmission job list DB 13a, a time designated e-mail transmission job for which the speed dial number for the transmission destination uses "1" and, as a result, extracts a job with job ID "10001" (S301). Because there is such a job, the process moves to S303 (S302).

Next, the post-process controller 27a selects, as display selections, "a: Switch to fax transmission and transmit fax" and "c: Retain e-mail address at time of scheduling" from the correspondence table shown in FIG. 11 (S303) and displays the process selection screen 61a (see FIG. 12) for the time e-mail transmission job on the input/output part 5 (S304).

Then, when the button 62a in the process selection screen 61 a is depressed and "a: Switch to fax transmission and transmit fax" is selected by the user of the multifunction peripheral 1, the process moves to S310 (S305).

Figure 13:
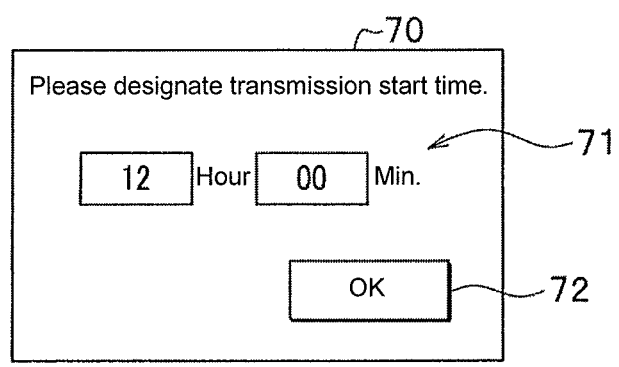
FIG. 13 is an explanatory diagram for explaining a transmission time designation screen for designating a transmission time of a time e-mail transmission job executed by the multifunction peripheral according to the second embodiment.

Next, the post-process controller 27a displays the transmission time designation screen shown in FIG. 13 on the input/output part 5 and requests the user to input transmission time. As "23:00" is inputted as the transmission time (S401), the image data is converted into the MMR format (S402), and the time transmission job list DB 13a is updated as shown in FIG. 10B (S403). When the time elapses and reaches 23:00, the fax transmission is performed (S501). This completes the explanation of the operation performed when the address information is updated in the multifunction peripheral according to the second embodiment.

<<Advantage of Multifunction Peripheral According to Second Embodiment>>

As described above, according to the second embodiment, by reconfiguring the transmission start time when the transmission method is changed from an e-mail transmission to a fax transmission, time during which a discount is applied to telephone charges can be designated, resulting a reduction of the telephone charges while allowing to switch to the fax transmission that has a higher reliability by checking the transmission and the like.

[Modification]

The embodiments of the present application are explained above. However, the present application is not limited to the embodiments and may be implemented in a scope that does not depart the object of the present application. Below are modification examples of the embodiments.

(Transmission Methods)

The transmission method is explained by using the fax transmission and the e-mail transmission in the first and second embodiments. However, other transmission methods, such as internet fax transmission, may be used.

(Correspondence Table for Display Selections for Time Transmission Jobs)

A process may be added to the correspondence table shown in FIG. 5 for user's convenience. For example, when a fax number is deleted and when no change is made to an e-mail address, a process "D: Cancel the schedule" may be added for the user who does not wish to change the transmission method. In addition, when the fax number is deleted and when the e-mail address is added, a process "A: Switch to e-mail transmission and transmit e-mail" may be added because the designation may be the same, although the chance is small. Similar manner applies to the correspondence table shown in FIG. 11.

What is claimed is:

1. A multifunction peripheral, comprising:
at least two types of communication parts that communicate based on communication destination information configured from first communication destination imformation and second communication destination information;
a communication destination information database in which identification information corresponding to a single communication destination, the first communication destination information and the second communication destination information are stored in correspondence with each other;
a post-process controller that
determines whether one or both of the first communication destination information and the second communication destination information that are stored in the communication destination information database and that each correspond to the identification information corresponding to the single communication destination updated, and
changes a subsequent process based on a determination result;
a job information database in which the identification information and job information that includes at least transmission schedule time information are updated at a time of scheduling transmission;
a display part that is configured to display images: and
an input part that is configured to input information by a user corresponding to the display part, wherein
when it is determined that the one of the first communication destination information and the second communication destination information is updated, the post-process controller causes the display part to display an image for confirming a correction in the job information database using a content of the communication destination information stored in the communication destination information database at the time of updating the job information, and an image for confirming to retain a content of the job information,
when it is determined that the both of the first communication destination information and the second communication destination information are updated, the post-process controller causes the display part to display an image for confirming a correction in the job information database using the content of the communication destination information stored in the communication destination information database at the time of updating the job information, and an image for confirming to delete the content of the job information, and
the post-process controller obtains a selection and confirmation result for the image displayed on the display part via the input part and causes a communication part to perform a communication based on the selection and confirmation result and the transmission schedule time information.

2. The multifunction peripheral according to claim 1, further comprising:
if one of the first communication destination information and the second communication destination information is updated, the post-process controller determines that update is for the communication destination information to which the updated one of the first communication destination information and the second communication destination information corresponds, and if both of the first communication destination information and the second communication destination information are updated, the post-process controller determines that the update is for a new communication destination that is different from the communication destination to which the updated first communication destination information and second communication destination information correspond.

3. The multifunction peripheral according to claim 1, wherein
   the first communication destination information is a fax number,
   the second communication destination information is an e-mail address, and
   the identification information is a speed dial number.

4. The multifunction peripheral according to claim 1, wherein
   the job information includes communication method information that specifies the two types of communication parts, and
   when it is determined that the one of the first communication destination information and the second communication destination information is updated, and when the communication destination information that corresponds to the communication method information is deleted or when communication destination information that does not correspond to the communication method information is added, the post-process controller causes the display part to display an image for changing the communication method information of the job information to another communication method.

5. The multifunction peripheral according to claim 4, wherein
   the post-process controller causes the display part to display an image for correcting the transmission schedule time information of the job information.

6. A multifunction peripheral, comprising:
   at least two types of communication part that communicates based on communication destination information configured from first communication destination information and second communication destination information;
   a communication destination information database in which identification information corresponding to respective destinations and the communication destination information are stored in correspondence with each other;
   a job information database in which the identification information and job information that includes at least transmission schedule time information are updated at a time of scheduling transmission;
   a display part that is configured to display images, and
   a post-process controller, wherein
   when either one of the first communication destination information and the second communication destination information in the communication destination information database is updated, the post-process controller causes the display part to display an image for confirming a correction in the job information database using a content of the communication destination information stored in the communication destination information database at the time of updating the job information, and an image for confirming to retain a content of the job information,
   when both of the first communication destination information and the second communication destination information in the communication destination information database are updated, the post-process controller causes the display part to display an image for comfirming a correction in the job information database using the content of the communication destination information stored in the communication destination information database at the time of updating the job information, and an image for confirming to delete the content of the job information.

7. The multifunction peripheral according to claim 6, further comprising:
   an input part for inputting a selection by a user corresponding to the display part, wherein
   the post-process controller obtains the selection and confirmation result for the image displayed on the display part via the input part and causes a communication part to perform a communication based on the selection and confirmation result and the transmission schedule time information.

8. A multifunction peripheral, comprising:
   a first communication part that communicates with a specified communication destination based on first communication destination information;
   a second communication part that communicates with the specified communication destination based on second communication destination information;
   a communication destination information database in which identification information corresponding to the specified communication destination, the first communication destination information and the second communication destination information are stored in correspondence with each other;
   an update part that updates at least one of the first communication destination information and the second communication destination information that respectively correspond to the identification information of the specified communication destination stored in the communication destination information database;
   a pre-registered information determination part that determines whether or not pre-registered information that corresponds to the first communication destination information and the second communication destination information respectively corresponding to the identification information of the specified communication destination exists when the at least one of the first communication destination information and the second communication destination information respectively corresponding to the identification information of the specified communication destination is updated by the update part;
   a display part that displays a message relating to the pre-registered information when the pre-registered information is determined to exist based on a determination result of the pre-registered information determination part; and
   a post-process controller that controls the message displayed by the display part, wherein the post-process controller
      determines whether one or both of the first communication destination information and the second communication destination information respectively corresponding to the identification information of the specified communication destination are updated by the update part, and selects a first message relating to the pre-registered information to be displayed by the display part when the one of the first communication destination information and the second communication destination information is updated and a second message relating to the pre-registered information to be displayed by the display part when the both of the first communication destination information and the second communication destination information are updated.

9. The multifunction peripheral according to claim 8, wherein the first communication destination information is a fax number, and the second communication destination information is an e-mail address.

10. The multifunction peripheral according to claim 8, wherein the pre-registered information is transmission scheduling data.

11. The multifunction peripheral according to claim 8, wherein when the both of the first communication destination information and the second communication destination information are updated, options for using one of the first communication destination information and the second communication destination information before the update and for deleting the pre-registered information are displayed, and when the one of the first communication destination information and the second communication destination information is updated, options for using the one of the first communication destination information and the second communication destination information after the updating by the update part and for using the one of the first communication destination information and the second communication destination information before the update are displayed.

\* \* \* \* \*